United States Patent
Ballard et al.

(10) Patent No.: US 11,999,042 B2
(45) Date of Patent: Jun. 4, 2024

(54) HYDRAULIC TOOL HAVING RAM PISTON WITH INTEGRATED OVERLOAD ASSEMBLY

(71) Applicant: Milwaukee Electric Tool Corporation, Brookfield, WI (US)

(72) Inventors: James G. Ballard, Waukesha, WI (US); James O. Myrhum, Jr., West Bend, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 146 days.

(21) Appl. No.: 17/051,396

(22) PCT Filed: Aug. 28, 2020

(86) PCT No.: PCT/US2020/048357
§ 371 (c)(1),
(2) Date: Oct. 28, 2020

(87) PCT Pub. No.: WO2021/041775
PCT Pub. Date: Mar. 4, 2021

(65) Prior Publication Data
US 2023/0191582 A1    Jun. 22, 2023

Related U.S. Application Data

(60) Provisional application No. 62/893,607, filed on Aug. 29, 2019.

(51) Int. Cl.
*B25F 5/00* (2006.01)
*F15B 15/14* (2006.01)
(Continued)

(52) U.S. Cl.
CPC .............. *B25F 5/005* (2013.01); *B25F 5/00* (2013.01); *F15B 15/1447* (2013.01);
(Continued)

(58) Field of Classification Search
CPC ...... F15B 15/1447; F15B 15/20; F15B 20/00; B23D 17/06; B23D 29/002; B25F 5/00;
(Continued)

(56) References Cited

U.S. PATENT DOCUMENTS 2,353,254 A * 7/1944 McCandless ......... F16K 17/162
420/502
3,155,271 A * 11/1964 Summers ............ F16K 17/1626
137/71
(Continued)

FOREIGN PATENT DOCUMENTS

CN      106949274 A    7/2017
EP         2187066 A1    5/2010
WO  2015/061425 A1    4/2015

*Primary Examiner* — Scott A Smith
(74) *Attorney, Agent, or Firm* — Quarles & Brady LLP

(57) ABSTRACT

Embodiments of the invention provide a ram assembly for a hydraulic tool. The ram assembly includes a ram piston having a ram cavity. The ram piston receives a hydraulic pressure reaction force. The ram assembly further includes an overload assembly disposed in the ram cavity or in a cavity defined by a manifold. The overload assembly includes a burst disc positioned at a first end of the ram cavity or manifold, a lock nut positioned at a second end of the ram cavity or manifold, and a spacer positioned between the burst disc and the lock nut. The spacer transfers a supporting force applied to the lock nut to the burst disc. The hydraulic pressure reaction force and the supporting force both act in the same direction, and thus, are additive forces acting on the burst disk.

20 Claims, 7 Drawing Sheets

(51) Int. Cl.
  *F16K 17/16*  (2006.01)
  *B23D 17/06*  (2006.01)
  *B23D 29/00*  (2006.01)
  *F16K 17/38*  (2006.01)

(52) U.S. Cl.
  CPC ............ *F16K 17/162* (2013.01); *B23D 17/06* (2013.01); *B23D 29/002* (2013.01); *F16K 17/16* (2013.01); *F16K 17/383* (2013.01)

(58) Field of Classification Search
  CPC ...... B25F 5/005; F16K 17/16; F16K 17/1606; F16K 17/1613; F16K 17/162; F16K 17/1626; F16K 17/383
  USPC ............. 173/218; 137/69, 71, 72, 79, 68.12, 137/68.24; 72/407
  See application file for complete search history.

(56) References Cited

U.S. PATENT DOCUMENTS

| | | | |
|---|---|---|---|
| 3,383,963 | A | 5/1968 | Vondrachek |
| 3,559,668 | A | 2/1971 | Crossman |
| 3,908,684 | A * | 9/1975 | Short ................. F16K 17/1613 137/68.29 |
| 4,064,890 | A * | 12/1977 | Collins, Jr. ........ G05D 16/0666 137/505.11 |
| 4,206,603 | A | 6/1980 | Mekler |
| 4,590,957 | A * | 5/1986 | McFarlane ............. F16K 17/16 220/89.2 |
| 4,750,510 | A * | 6/1988 | Short, III ............ F16K 17/1606 137/910 |
| 5,048,554 | A * | 9/1991 | Kremer .................. F16K 1/305 137/69 |
| 5,213,128 | A * | 5/1993 | Baird ................... G05D 23/021 137/79 |
| 5,647,390 | A * | 7/1997 | Wass .................... F16K 17/383 137/68.12 |
| 5,836,400 | A | 11/1998 | Tupper et al. |
| 5,884,540 | A | 3/1999 | Mo |
| 5,961,521 | A | 10/1999 | Roger et al. |
| 6,230,733 | B1 * | 5/2001 | Strelow .................. F16K 17/16 137/68.24 |
| 6,401,515 | B2 | 6/2002 | Frenken |
| 6,769,356 | B2 | 8/2004 | Frenken |
| 7,254,982 | B2 * | 8/2007 | Frenken .................... B25F 5/02 72/407 |
| 7,533,556 | B2 * | 5/2009 | Lefavour ................ B25F 5/005 60/477 |
| 7,788,962 | B2 | 9/2010 | Chiasson et al. |
| 7,814,827 | B2 | 10/2010 | Frenken et al. |
| 7,937,838 | B2 | 5/2011 | Patton |
| 7,954,742 | B2 | 6/2011 | Ramun et al. |
| 8,251,157 | B2 | 8/2012 | Gray et al. |
| 8,266,991 | B2 | 9/2012 | Thorson et al. |
| 8,316,549 | B2 | 11/2012 | Musser |
| 8,327,868 | B2 * | 12/2012 | Lammers ................ F17C 13/04 220/89.4 |
| 8,683,704 | B2 | 4/2014 | Scott et al. |
| 8,763,257 | B2 | 7/2014 | Thorson et al. |
| 8,844,436 | B2 | 9/2014 | Frenken |
| 8,851,200 | B2 | 10/2014 | Gray et al. |
| 8,875,404 | B2 | 11/2014 | Scott et al. |
| 8,925,567 | B2 * | 1/2015 | Schulze ................ F16K 17/383 137/72 |
| 8,966,691 | B2 | 3/2015 | Richards |
| 9,016,317 | B2 | 4/2015 | Myrhum, Jr. |
| 9,196,881 | B2 | 11/2015 | Gray et al. |
| 9,302,402 | B2 | 4/2016 | Thorson et al. |
| 9,448,051 | B2 * | 9/2016 | Morrison ................. F42D 1/04 |
| 9,484,700 | B2 | 11/2016 | Kehoe |
| 9,486,864 | B2 | 11/2016 | Luo et al. |
| 9,486,865 | B2 | 11/2016 | Scott et al. |
| 9,669,533 | B2 | 6/2017 | Myrhum, Jr. |
| 9,722,334 | B2 | 8/2017 | Sterling et al. |
| 9,808,851 | B2 | 11/2017 | Thorson et al. |
| 9,822,805 | B2 | 11/2017 | De Gier |
| D805,365 | S | 12/2017 | Ballard et al. |
| 9,873,187 | B2 | 1/2018 | Bungler |
| 9,960,509 | B2 | 5/2018 | Sterling et al. |
| 9,993,885 | B2 | 6/2018 | Frenken |
| 10,046,470 | B2 | 8/2018 | Thorson et al. |
| 10,058,989 | B2 | 8/2018 | Chellen |
| 10,093,012 | B2 | 10/2018 | Koski et al. |
| 10,128,723 | B2 | 11/2018 | Mergener et al. |
| 10,213,821 | B2 | 2/2019 | Thorson et al. |
| 10,226,826 | B2 | 3/2019 | Kehoe et al. |
| 10,228,069 | B2 * | 3/2019 | Wilson ............... B23K 15/0006 |
| 10,265,758 | B2 | 4/2019 | Skinner et al. |
| 10,270,263 | B2 | 4/2019 | Brozek |
| 10,312,653 | B2 | 6/2019 | Ballard et al. |
| 10,339,496 | B2 | 7/2019 | Matson et al. |
| 10,343,266 | B2 | 7/2019 | Theiler et al. |
| 10,380,883 | B2 | 8/2019 | Matson et al. |
| 10,385,983 | B2 * | 8/2019 | Ligeti ..................... F16K 17/16 |
| 10,428,843 | B2 | 10/2019 | Ballard et al. |
| D866,623 | S | 11/2019 | Fenske |
| 10,498,195 | B2 | 12/2019 | Mergener et al. |
| D878,435 | S | 3/2020 | Fenske |
| 10,576,557 | B2 | 3/2020 | Fenske |
| 10,618,151 | B2 | 4/2020 | Kanack et al. |
| 10,700,575 | B2 | 6/2020 | Hessenberger et al. |
| 2005/0011236 | A1 | 1/2005 | Frenken et al. |
| 2007/0003392 | A1 | 1/2007 | Frenken et al. |
| 2008/0069663 | A1 | 3/2008 | Frenken et al. |
| 2009/0229842 | A1 | 9/2009 | Gray et al. |
| 2010/0088898 | A1 | 4/2010 | Thorson et al. |
| 2010/0325894 | A1 | 12/2010 | Scott et al. |
| 2011/0005083 | A1 | 1/2011 | Scott et al. |
| 2011/0005084 | A1 | 1/2011 | Thorson et al. |
| 2011/0266834 | A1 | 11/2011 | Beumer et al. |
| 2012/0318546 | A1 | 12/2012 | Gray et al. |
| 2013/0008031 | A1 | 1/2013 | Thorson et al. |
| 2013/0097873 | A1 | 4/2013 | Luo et al. |
| 2014/0034159 | A1 | 2/2014 | Myrhum, Jr. |
| 2014/0173907 | A1 | 6/2014 | Scott et al. |
| 2014/0182137 | A1 | 7/2014 | Liu et al. |
| 2015/0014008 | A1 | 1/2015 | Gray et al. |
| 2015/0217438 | A1 | 8/2015 | Myrhum, Jr. |
| 2016/0099533 | A1 | 4/2016 | Kehoe |
| 2016/0214265 | A1 | 7/2016 | Thorson et al. |
| 2016/0252112 | A1 | 9/2016 | Kehoe et al. |
| 2016/0288193 | A1 | 10/2016 | Thorson et al. |
| 2016/0329674 | A1 | 11/2016 | Ballard et al. |
| 2016/0363510 | A1 | 12/2016 | Kanack et al. |
| 2016/0364687 | A1 | 12/2016 | Matson et al. |
| 2016/0373457 | A1 | 12/2016 | Matson et al. |
| 2017/0013740 | A1 | 1/2017 | Mergener et al. |
| 2017/0271893 | A1 | 9/2017 | Brozek |
| 2017/0350027 | A1 | 12/2017 | Belbachir et al. |
| 2017/0355027 | A1 | 12/2017 | D'Antuono |
| 2017/0356472 | A1 | 12/2017 | Ballard et al. |
| 2018/0021840 | A1 | 1/2018 | Thorson et al. |
| 2018/0085903 | A1 | 3/2018 | Wackwitz et al. |
| 2018/0085909 | A1 | 3/2018 | Koski et al. |
| 2018/0093319 | A1 | 4/2018 | Skinner et al. |
| 2018/0099388 | A1 | 4/2018 | Koski et al. |
| 2018/0147618 | A1 | 5/2018 | Skinner et al. |
| 2018/0281272 | A1 | 10/2018 | Dickert et al. |
| 2018/0311805 | A1 | 11/2018 | Koski et al. |
| 2018/0326600 | A1 | 11/2018 | Wason et al. |
| 2019/0052149 | A1 | 2/2019 | Mergener et al. |
| 2019/0151967 | A1 | 5/2019 | Kehoe et al. |
| 2019/0156278 | A1 | 5/2019 | Matson et al. |
| 2019/0176207 | A1 | 6/2019 | Thorson et al. |
| 2019/0232481 | A1 | 8/2019 | Skinner et al. |
| 2019/0260266 | A1 | 8/2019 | Hessenberger et al. |
| 2019/0318616 | A1 | 10/2019 | Matson et al. |
| 2020/0001446 | A1 | 1/2020 | Ballard et al. |
| 2020/0055130 | A1 | 2/2020 | D'Antuono et al. |
| 2020/0061854 | A1 | 2/2020 | D'Antuono |
| 2020/0070262 | A1 | 3/2020 | D'Antuono |
| 2020/0070263 | A1 | 3/2020 | Olbrich |

(56) References Cited

U.S. PATENT DOCUMENTS

| | | |
|---|---|---|
| 2020/0147771 A1 | 5/2020 | Mergener et al. |
| 2020/0180128 A1 | 6/2020 | Schneider et al. |
| 2020/0238487 A1 | 7/2020 | Kanack et al. |
| 2020/0261959 A1 | 8/2020 | Wekwert et al. |
| 2020/0266684 A1 | 8/2020 | Hessenberger et al. |

* cited by examiner

HYDRAULIC TOOL HAVING RAM PISTON WITH INTEGRATED OVERLOAD ASSEMBLY

RELATED APPLICATIONS

The present application represents the national stage entry of International Application No. PCT/US2020/048357, filed Aug. 28, 2020, which claims priority to U.S. Provisional Application No. 62/893,607, filed Aug. 29, 2019, entitled "Hydraulic Tool Having Ram Piston Design with Integrated Overload Assembly," the content of which is incorporated herein by reference in its entirety.

BACKGROUND

Hydraulic crimpers and cutters are different types of hydraulic power tools, such as portable, handheld hydraulic tools, for performing work (e.g., crimping or cutting) on a work piece. A hydraulic pump pressurizes hydraulic fluid and transfers it to a cylinder in the tool. This cylinder causes an extendible piston to be displaced toward a cutting or crimping head. The piston exerts a force on the head of the power tool, which typically includes opposed jaws with certain cutting or crimping features, depending upon the particular configuration of the power tool. In this case, the force exerted by the piston closes the jaws to perform cutting or crimping on a work piece (e.g., a wire) at a targeted location.

One known hydraulic tool can include an overload assembly configured to burst if the hydraulic tool exceeds a predetermined high-pressure set point. In normal operation, when the hydraulic tool reaches or exceeds the predetermined high-pressure set point, a load-sensing device of the hydraulic power tool can shut down a motor of the hydraulic tool. If the load-sensing device fails to shut off the motor at the predetermined high-pressure set point, the overload assembly can burst, opening high pressure lines to a reservoir and preventing the hydraulic tool from pressurizing. A typical overload assembly can include a lock nut that is in contact with a spacer, which separates the lock nut from a burst disc (also referred to as a "burst cap") or similar overload device.

There are certain perceived disadvantages of using an assembly such as this, however. For example, during operation of the hydraulic tool, downward movement of the piston pressurizes the hydraulic fluid and forces the hydraulic fluid into the hydraulic fluid passage circuit, causing a reaction force to push on the burst disc, which in turn causes a supporting force from the lock nut to counter the reaction force from the hydraulic pressure. However, because the two forces are in opposite directions, the resulting force that is required to seal the burst disc decreases, which can result in leakage at the burst disc. In order to achieve a significantly larger resulting force, the supporting force on the burst disc must increase, reducing the fatigue life of the burst disc and working against the sealing of the burst disc.

SUMMARY

Embodiments of the invention provide a ram assembly for a hydraulic tool. The ram assembly includes a ram piston having a ram cavity at an end of the ram piston, the ram piston configured to receive a hydraulic pressure reaction force and an overload assembly. The overload assembly can be disposed in the ram cavity. The overload assembly can include a burst disc positioned at a first end of the ram cavity and a lock nut positioned at a second end of the ram cavity, the second end opposite the first end, and configured to receive a supporting force. The hydraulic pressure reaction force and the supporting force can be additive.

In some embodiments, the hydraulic tool can include a manifold that defines a ram chamber having a fluid inlet configured to receive a pressurized hydraulic fluid, a ram assembly having a ram piston disposed within at least a portion of the ram chamber, a burst disc having a peripheral flange, a spacer in contact with the burst disc at the peripheral flange, and a lock nut configured to receive a first force acting in a first direction and a second force acting in the first direction.

Some embodiments of the invention provide a hydraulic tool that can include a manifold defining a ram chamber and a cavity. The cavity can be located along a hydraulic fluid path within the hydraulic tool. The hydraulic tool can include an overload assembly disposed in the cavity defined by the manifold. The overload assembly can include a burst disc positioned at a first end of the cavity, and a lock nut positioned at a second end of the cavity, the second end opposite the first end. During operation of the hydraulic tool, hydraulic pressure can be created in the ram chamber, by which a hydraulic pressure reaction force acts on the lock nut and a supporting force from the lock nut acts on the burst disc so that both the hydraulic pressure reaction force and the supporting force act in the same direction and seal the burst disc against the first end of the cavity.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
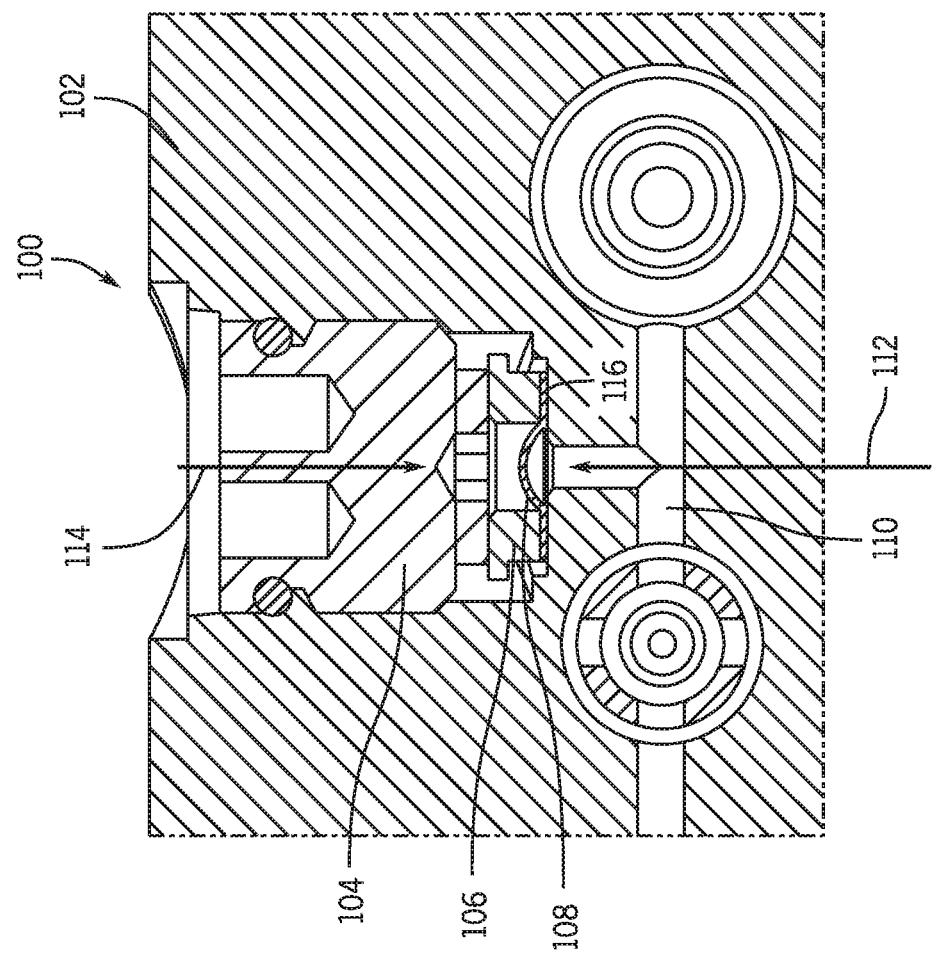
FIG. 1 is a cross-sectional view of an overload assembly that exists in some known hydraulic tools.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The overload assembly according to embodiments of the invention can be part of a hydraulic power tool. In one embodiment, the hydraulic power tool can include a cutting or crimping head, an electric motor, a pump driven by the motor, and a housing defining a cylinder. An extendable ram piston can be disposed within the cylinder. The pump can provide pressurized hydraulic fluid through a hydraulic fluid passage circuit to the ram piston, causing the ram piston to extend from the housing to actuate the jaws of the cutting or crimping head for cutting or crimping a work piece, such as a wire. Other power sources can be used to power the tool. Once a work piece or other target is placed between the jaws, the hydraulic power tool can be powered to close the jaws to perform a cutting or crimping action and cut or crimp the work piece or other target.

As discussed above, known hydraulic power tools can include an overload assembly that bursts when the hydraulic tool exceeds a predetermined high-pressure set point, such as when a primary pressure control device (e.g., a pressure transducer) of the hydraulic tool fails to shut off the motor at the predetermined high-pressure set point.

FIG. 1 is an example of an overload assembly 100. The overload assembly 100 and its components are housed in a manifold 102. Components of the overload assembly 100 include a lock nut 104, a spacer 106, and a burst disc 108. The overload assembly 100 is positioned proximate to a portion of a hydraulic fluid passage circuit 110. In the overload assembly 100, the lock nut 104 counters a hydraulic pressure reaction force 112 that pushes on the burst disc 108 with a supporting force 114.

An increase in the hydraulic pressure reaction force 112 acting on the burst disc 108 can reduce the sealing force on the burst disc 108 against the mounting surface 116. Additionally, because the supporting force 114 counteracts the hydraulic pressure reaction force 112, an increase in the hydraulic pressure reaction force 112 induces an increase in the supporting force 114 acting on the burst disc 108, causing fatigue of the burst disc 108.

Accordingly, the overload assembly according to embodiments of the invention integrates a burst disc and other overload assembly components into a ram piston of a hydraulic tool, creating forces during operation that are additive instead of opposing. In some embodiments, the overload assembly can be integrated into a manifold of a hydraulic tool so that additive forces are created.

Figure 2:
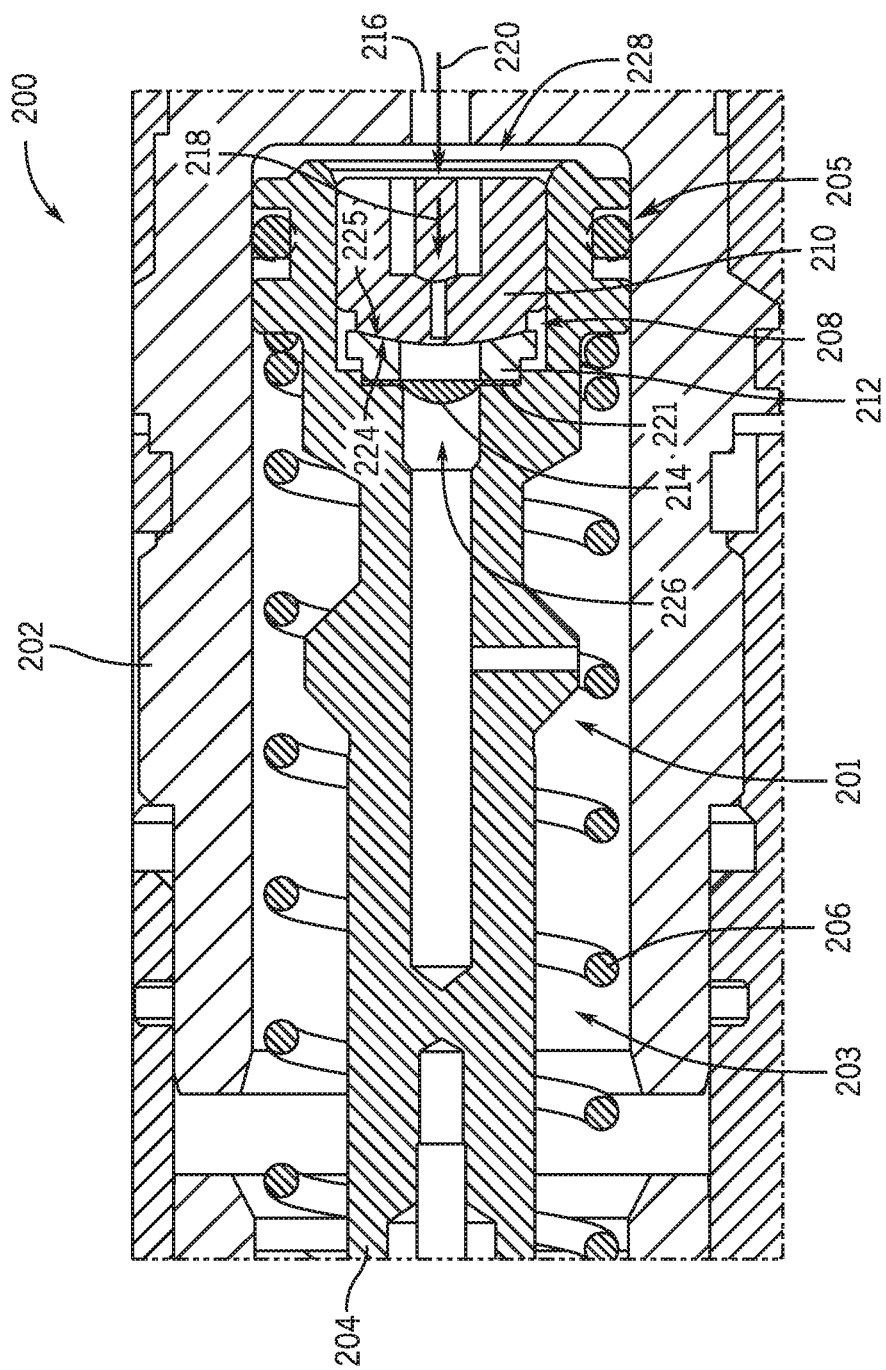
FIG. 2 is a cross-sectional view of an overload assembly according to one embodiment of the invention.

FIG. 2 illustrates an overload assembly 200 according to one embodiment of the invention. The overload assembly 200 can be housed within a manifold 202 defining a ram chamber 201 configured to contain various component parts of a ram assembly, such as a ram piston 204 and a spring 206. More particularly, the overload assembly 200 can be integrated with the ram assembly, namely, with the ram piston 204. For example, one end of the ram piston 204 can include a ram cavity 208 in which a lock nut 210, a spacer 212, and a burst disc 214 can be disposed. In particular, the end of the ram piston 204 that includes the ram cavity 208 can be the end of the ram piston 204 located proximate to a fluid inlet 216 through which the ram chamber 201 is in fluid communication with other portions of the hydraulic fluid passage circuit.

In some embodiments, the spacer 212 includes an aperture 213. In some embodiments, the spacer 212 includes a peripheral flange 215 extending generally radially. Although the spacer 212 is included in the overload assembly 200, alternative embodiments of the overload assembly 200 might not include a spacer. Further, in other embodiments, additional components could be included between lock nut 210 and the burst disc 214 additionally or alternatively to the spacer 212.

The spring 206 can surround an outer surface of the ram piston 204. In some embodiments, the spring 206 can be positioned to extend from a front portion 203 of the ram chamber 201 to a back portion 205 of the ram chamber 201 during cutting or crimping actions. The spring 206 can be affixed at the front portion 203 of the ram chamber 201. In some embodiments, the ram chamber 201 might contain another type of device instead of a spring 206, such as an O-ring, for example.

The lock nut 210 can be configured and arranged so that a supporting force created by the lock nut 210 (i.e., supporting force 218, which is a force generated by the torqueing of the lock nut 210) acts in the same direction as a hydraulic pressure reaction force (i.e., a hydraulic pressure reaction force 220) that pushes on the ram piston 204 (and thus pushes on the lock nut 210).

As shown in FIG. 2, the burst disc 214 is located at the first end 226 of the ram cavity 208, the lock nut 210 is positioned at a second end 228 of the ram cavity 208, opposite the first end 226. In addition, the lock nut 210 can be in threaded contact with an interior surface of the ram cavity 208 or can be coupled to the ram cavity 208 in an alternative manner. Further, the spacer 212 is positioned between the burst disc 214 and the lock nut 210.

Figure 3:
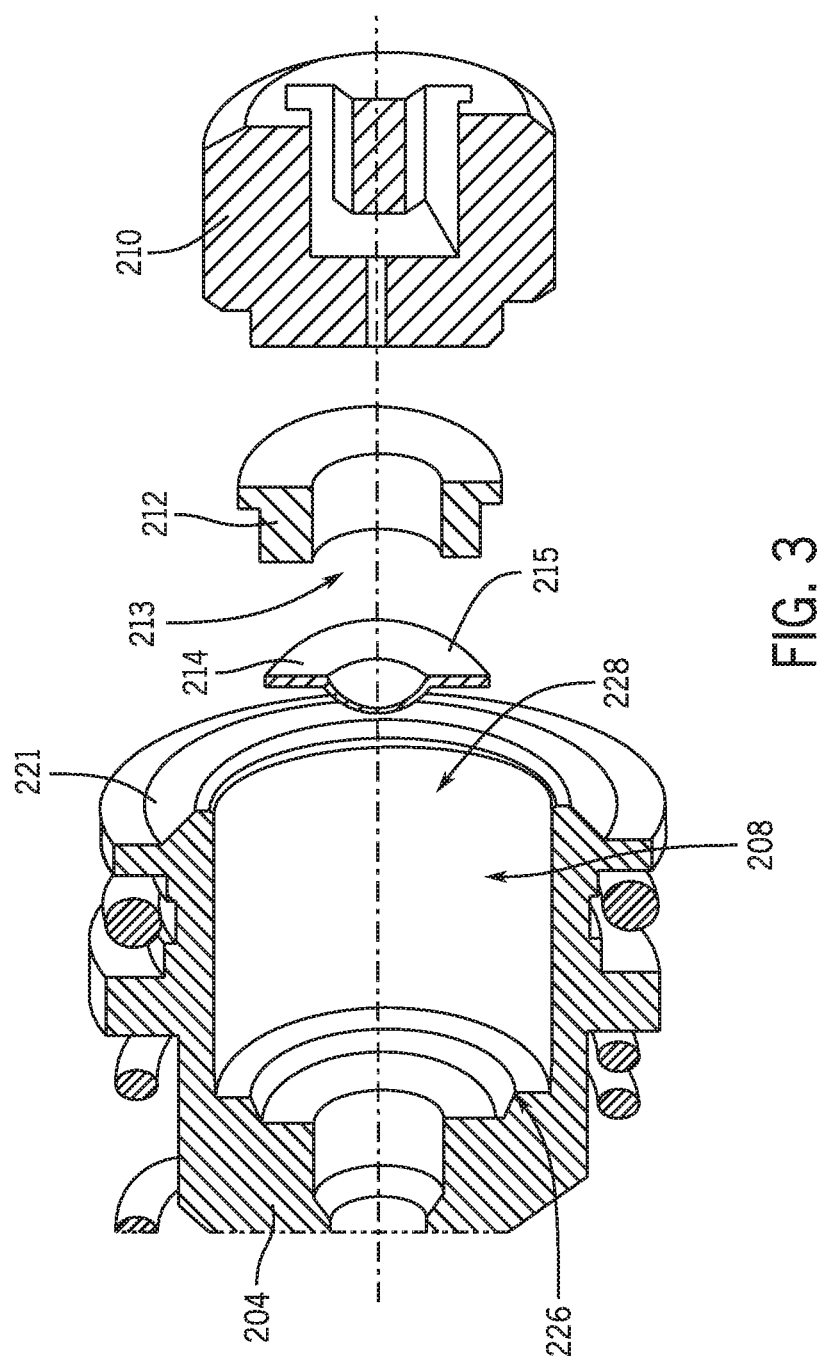
FIG. 3 is an exploded cross-sectional view of a portion of the overload assembly of FIG. 2.

FIG. 3 illustrates a portion of the overload assembly 200 of FIG. 2. In particular, FIG. 3 shows, from left to right, the ram cavity 208 of the ram piston 204, the burst disc 214, the spacer 212, and the lock nut 210. Although no threading or similar structure is shown on an interior surface of the ram cavity 208, some embodiments of the overload assembly 200 can have the lock nut 210 in threaded contact with the interior surface of the ram cavity 208.

In operation of a hydraulic tool that includes the overload assembly 200, hydraulic fluid passes through the fluid inlet 216 and creates hydraulic pressure at the back portion 205 of the ram chamber 201, creating the hydraulic pressure reaction force 220 that facilitates movement of the ram piston 204. Further, the supporting force 218 acts on the burst disc 214 (i.e., by being transmitted by the spacer 212) in the same direction as the hydraulic pressure reaction force 220, as shown in FIG. 2. Since both the supporting force 218 and the hydraulic pressure reaction force 220 are acting in the same direction, the two forces are additive and both act on the burst disc 214. Thus, both forces work to seal the burst disc 214 against a mounting surface of the ram cavity 208 (i.e., mounting surface 221).

Having the overload assembly 200 integrated into the ram piston 204 in this manner can advantageously utilize forces applied during operation of the hydraulic tool to help seal the burst disc 214, even at higher pressures, without causing excessive force to be placed on the burst disc 214. This can advantageously help achieve an improved sealing of the burst disc 214. Since less force is placed on the burst disc 214, the fatigue life of the burst disc 214 can be lengthened.

In alternative embodiments, a similar sealing-assistance effect can be achieved with the overload assembly 200 in alternative locations. Particularly, instead of being integrated in the ram piston 204, the overload assembly 200 can be positioned in the manifold 202 in such a way (e.g., having a particular orientation and location in the manifold 202) that causes the hydraulic pressure reaction force 220 and the supporting force 218 to be additive.

Figure 4:
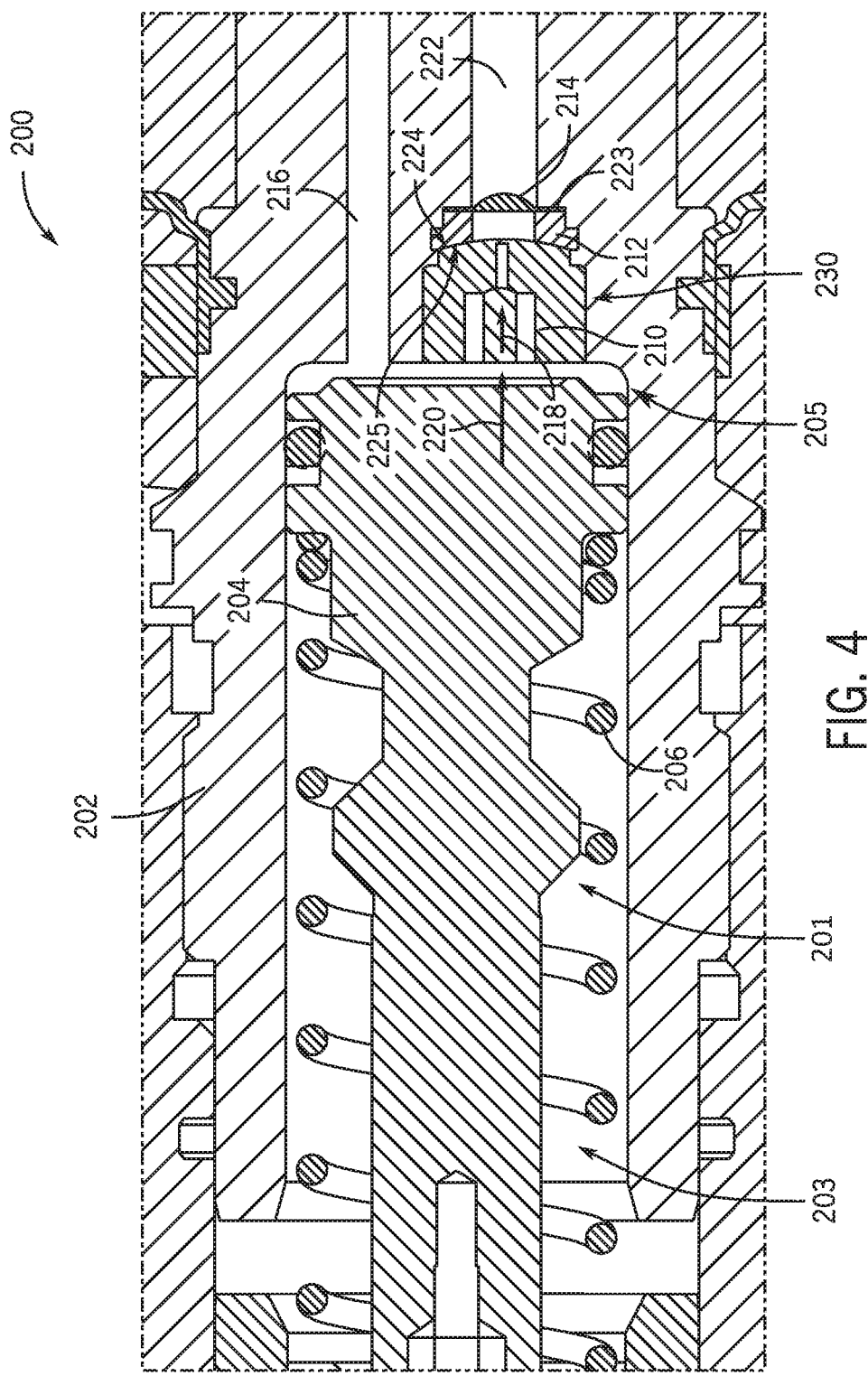
FIG. 4 is a cross-sectional view of a portion of the overload assembly according to another embodiment of the invention.

FIG. 4 illustrates an alternative embodiment where the overload assembly 200 is located in the manifold 202 proximate to the back portion 205 of the ram chamber 201. More particularly, the overload assembly 200 is located along a portion of a hydraulic fluid path that defines a fluid outlet 222 through which the ram chamber 201 is in fluid communication with another location, such as a fluid reservoir of the hydraulic tool. To facilitate this, a portion of the manifold 202 along the hydraulic fluid path (and, in this particular arrangement, along the portion of the hydraulic fluid path that defines the fluid outlet 222) can be configured (e.g., machined) to include a bore 230 or other type of cavity that houses the overload assembly 200. As shown, the burst disc 214 can be sealed against a mounting surface 223 of the manifold 202 at one end of the cavity (i.e., opposite the other end of the cavity that is located closer to the back portion of the ram chamber 201).

In operation of a hydraulic tool that includes the overload assembly 200 shown in FIG. 4, hydraulic fluid passes through the fluid inlet 216 and creates hydraulic pressure at the back portion 205 of the ram chamber 201, creating the hydraulic pressure reaction force 220 in the ram chamber 201, which acts on the lock nut 210. Further, the supporting force 218 acts on the burst disc 214 (i.e., by being transmitted by the spacer 212) in the same direction as the hydraulic pressure reaction force 220. Since both the supporting force 218 and the hydraulic pressure reaction force 220 are acting in the same direction, the two forces are additive and both act on the burst disc 214. Thus, both forces work to seal the burst disc 214 against mounting surface 223 of the ram cavity 208.

There are other perceived disadvantages of using known hydraulic tools as well, such as known hydraulic tools that include the overload assembly 100 of FIG. 1 or similar overload assemblies. For example, in some known overload assemblies, such as the overload assembly 100 of FIG. 1, the lock nut 104 and the spacer 106 are typically selected so that the surfaces of the lock nut 104 and the spacer 106 that are in contact with each other are flat or substantially flat. In this arrangement, however, the lock nut 104 and the spacer 106 can become misaligned, such as when the contacting surfaces are not machined to a desired degree (e.g., a gap exists between the lock nut 104 and the spacer 106 at one or more locations across their contacting surface areas) and/or when one or both components are displaced due to movement during normal operation of the hydraulic tool. This misalignment can, in turn, create or increase a radial imbalance in the sealing force on the burst disc 108, in which case the burst disc 108 might not be held down properly enough against the manifold 102 to sufficiently keep the burst disc 108 sealed in place.

Figure 5:
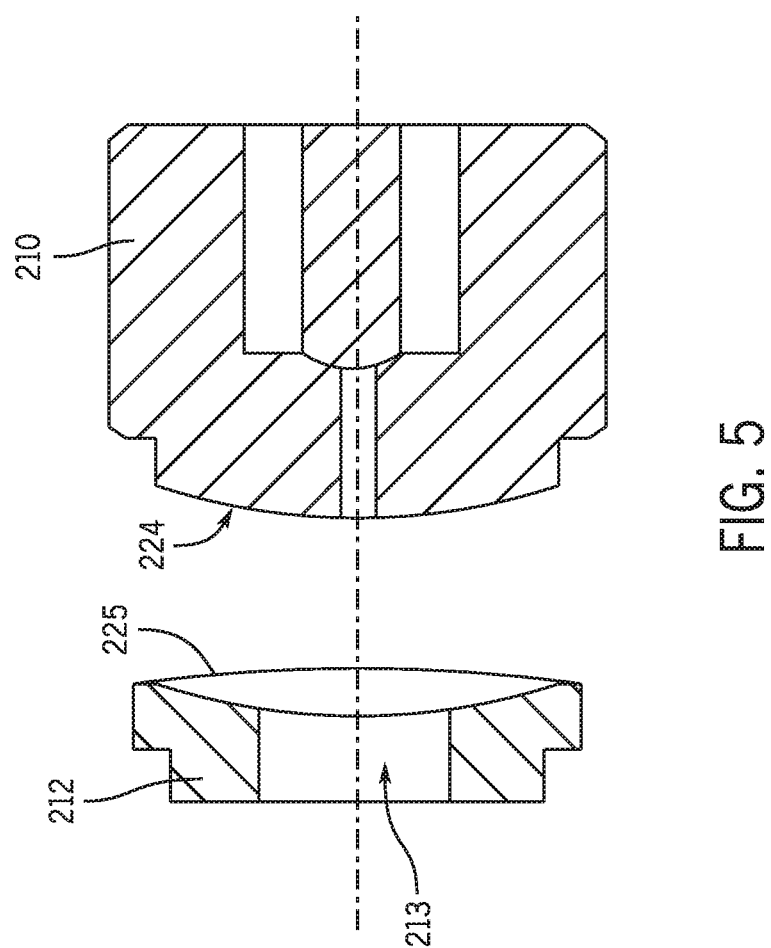
FIG. 5 is an exploded cross-sectional view of a portion of the overload assembly of FIG. 4.

In some embodiments of the invention, the lock nut 210 and the spacer 212 of the overload assembly 200 can be configured to help self-align during operation of the hydraulic tool. To facilitate this, each of the lock nut 210 and the spacer 212 can have radially-contoured surfaces 224, 225 that allow the overload assembly 200 to compensate for misalignment that might result during operation of the hydraulic tool or for other reasons. For example, as shown in FIG. 2, and as similarly shown in FIGS. 3, 4, and 5, a surface 224 of the lock nut 210 can be a convex radial surface and a surface 225 of the spacer 212 can be a concave radial surface. In some embodiments, surface 224 and surface 225 can be contoured so that a radius of surface 224 substantially matches a radius of surface 225, which can help promote alignment between the two surfaces so that they have substantially matching contours. Alternative configurations of surface 224 and/or surface 225 are possible as well. For example, surface 225 can be a conical surface instead of a concave radial surface. As another example, surface 224 can be a concave radial surface and surface 225 can be a convex radial surface.

In these embodiments, a substantially constant force can be maintained against the burst disc 214, preventing or reducing force on the burst disc 214 and keeping the burst disc 214 (i.e., the peripheral flange 215 of the burst disc 214) in place flat against the surface to which it is mounted (i.e., mounting surface 221).

Figure 6:
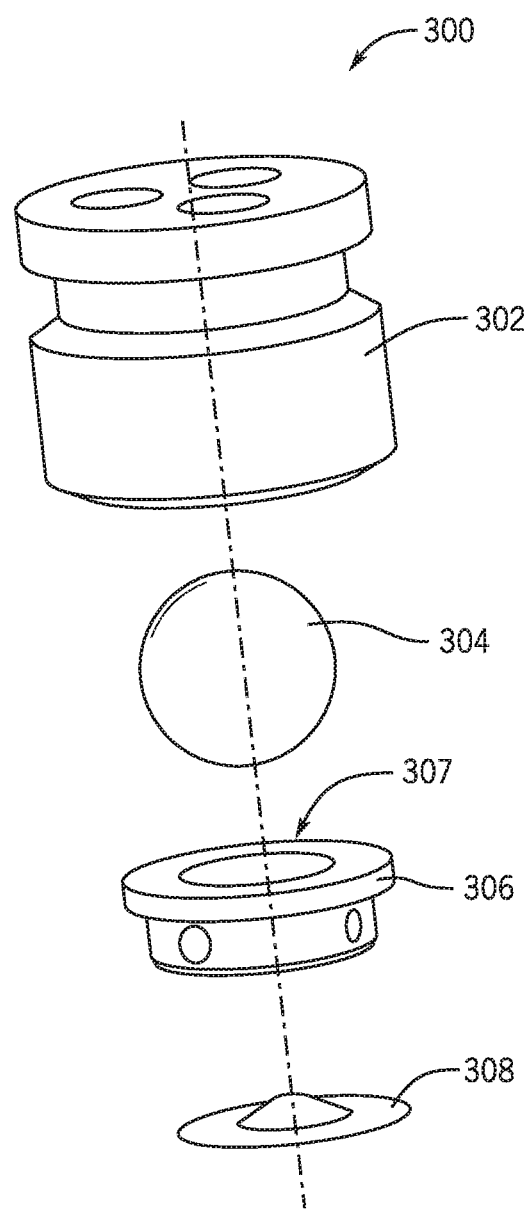
FIG. 6 is an exploded perspective view of an overload assembly according to another embodiment of the invention.
Figure 7:
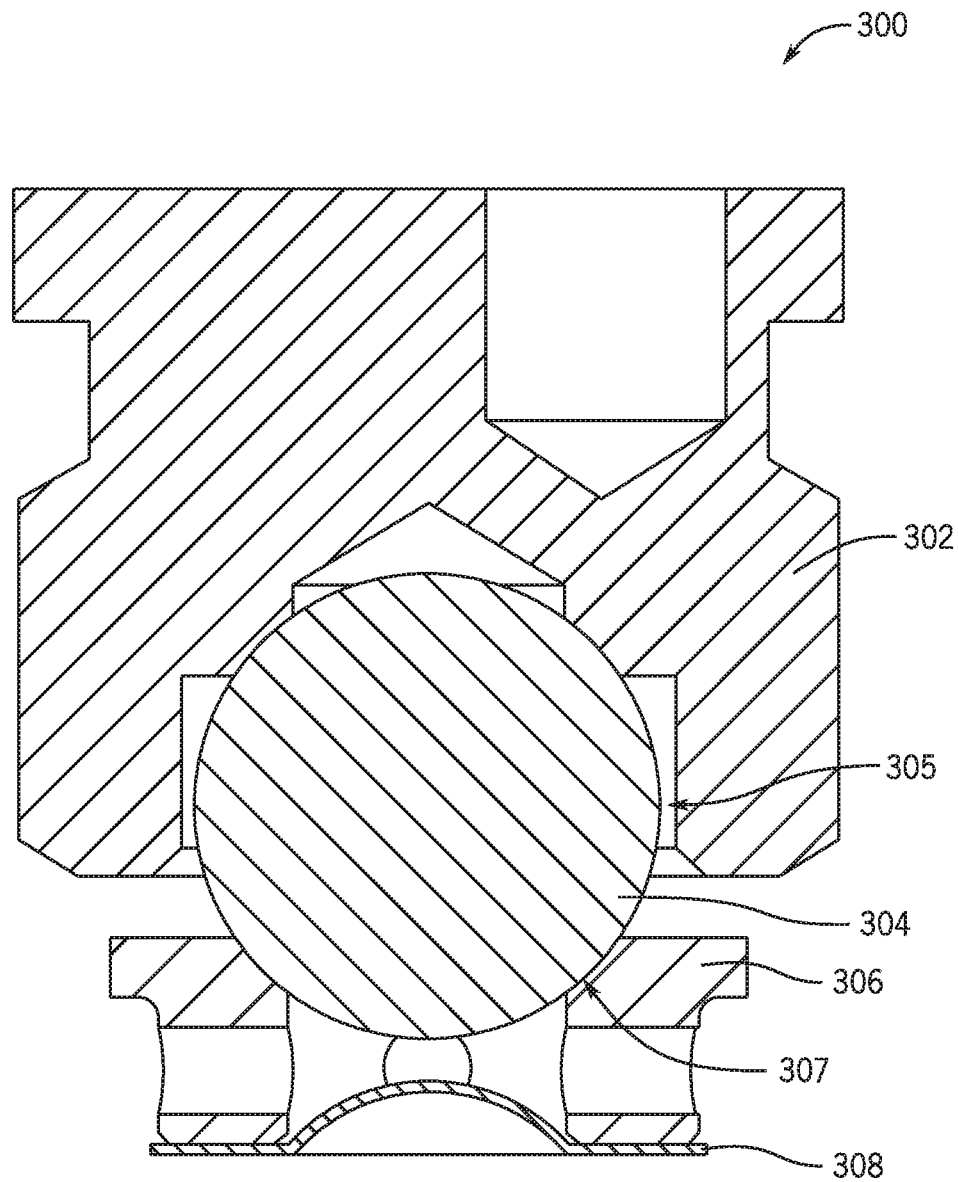
FIG. 7 is a cross-sectional view of the overload assembly of FIG. 6.

FIG. 6 illustrates an exploded view of an overload assembly 300 according to another embodiment of the invention, and FIG. 7 illustrates a cross-sectional view of the overload assembly 300. In particular, the overload assembly 300 includes a lock cap 302, a ball 304, a spacer 306, and a burst disc 308.

The lock cap 302 can be configured to lock the overload assembly 300 in a manifold (e.g., the ram cavity 208) and to provide a force on the ball 304. The lock cap 302 can include a recess 305 at one end of the lock cap 302, where the recess 305 is configured to house at least a portion of the ball 304. The recess 305 can be contoured to substantially match a contour of the ball 304.

The lock cap 302 can be made of metal or another material. In alternative embodiments, the lock cap 302 can take the form of a lock nut that is threaded to another surface (e.g., to the manifold 102 or to the ram cavity 208), such as lock nut 210 of FIG. 2.

The ball 304 can be a spherical object made of metal or another material. The ball 304 can be configured to support radial and/or axial loads and transfer loads from the lock cap 302 to the spacer 306. The ball 304 can act as a universal joint for alignment of the overload assembly 300.

In alternative embodiments, the lock cap 302 and the ball 304 can be integrated together by machining a sphere on a bottom end of the lock cap 302. In these embodiments, the bottom end of the lock cap 302 can include a spherical protrusion configured to contact the spacer 306 and transfer loads from the lock cap 302 to the spacer 306, and the spacer 306 can include a recess 307 that is contoured to substantially match a contour of the spherical protrusion.

The spacer 306 can be configured to house at least a portion of the ball 304 so that the spacer 306 receives the load from the ball 304. For example, the spacer 306 can include a recess 307 that is contoured to substantially match a contour of the ball 304. Further, the spacer 306 can be configured to serve the same or similar purpose as the spacer 212 of FIG. 2 (i.e., to transfer forces to the burst disc 308 and to provide a leak path when the burst disc 308 is ruptured). The burst disc 308 can take the same or similar form and serve the same or similar purpose as the burst disc 214 of FIG. 2.

With the arrangement of the overload assembly 300, the ball 304 helps maintain a substantially balanced force against the spacer 306 (and thus, against the burst disc 308) during operation of the hydraulic tool, improving the effectiveness of the seal of the burst disc 308 (e.g., keeping the peripheral flange 215 of the burst disc 308 in place flat against mounting surface 221 of FIG. 2, or mounting surface 223 of FIG. 4). Furthermore, the overload assembly 300 (and, likewise, the embodiments having the concave/convex/etc. surfaces described above) can be cheaper and easier to manufacture.

By the term "substantially" or "about" used herein, it is meant that the recited characteristic, parameter, value, or geometric planarity need not be achieved exactly, but that deviations or variations, including for example, tolerances, measurement error, measurement accuracy limitations and other factors known in the art, may occur in amounts that do not preclude the effect the characteristic was intended to provide.

The description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A ram assembly for a hydraulic tool, the ram assembly comprising:
   a ram piston having a ram cavity at an end of the ram piston, the ram piston receiving a hydraulic pressure reaction force; and
   an overload assembly disposed in the ram cavity, the overload assembly including:
   a burst disc positioned at a first end of the ram cavity;
   a lock nut positioned at a second end of the ram cavity, the second end opposite the first end, the lock nut receiving a supporting force;
   the hydraulic pressure reaction force and the supporting force acting in the same direction; and
   a spacer positioned between the burst disc and the lock nut, the spacer transferring the supporting force applied from the lock nut to the burst disc.

2. The ram assembly of claim 1, wherein the first end comprises a mounting surface, and the burst disc is mounted to the mounting surface so that a peripheral flange of the burst disc is substantially flat against the mounting surface.

3. The ram assembly of claim 1, wherein the lock nut is threaded to the second end of the ram cavity and the supporting force is generated by torqueing the lock nut.

4. The ram assembly of claim 1, wherein the spacer includes a concave radial surface and the lock nut includes a convex radial surface,
   the concave radial surface in contact with the convex radial surface and having substantially matching contours.

5. The ram assembly of claim 1, wherein the spacer includes a conical surface and the lock nut includes a convex radial surface,
   the conical surface in contact with the convex radial surface.

6. The ram assembly of claim 1, wherein the spacer includes a convex radial surface and the lock nut includes a concave radial surface,
   the convex radial surface in contact with the concave radial surface and having substantially matching contours.

7. The ram assembly of claim 1, wherein the overload assembly further comprises a ball positioned between the lock nut and the spacer,
   the ball configured to transfer loads from the lock nut to the spacer, and
   the lock nut and the spacer each include a recess contoured to substantially match a contour of the ball.

8. The ram assembly of claim 1, wherein a spring surrounds an outer surface of the ram piston.

9. A hydraulic tool comprising:
   a manifold that defines a ram chamber having a fluid inlet to receive a pressurized hydraulic fluid;
   a ram assembly having a ram piston disposed within at least a portion of the ram chamber;
   a burst disc having a peripheral flange;
   a spacer in contact with the burst disc at the peripheral flange; and
   a lock nut configured to receive a first hydraulic pressure reaction force acting in a first direction and a second supporting force acting in the first direction;
   the spacer positioned between the burst disc and the lock nut to transfer the supporting force applied from the lock nut to the burst disc.

10. The hydraulic tool of claim 9, wherein the first hydraulic pressure reaction force results from the pressurized hydraulic fluid pushing on the ram piston during operation of the hydraulic tool, and the second supporting force is applied on the lock nut and transferred to the burst disc.

11. The hydraulic tool of claim 9, further comprising:
    a hydraulic fluid passage circuit for hydraulically driving the hydraulic tool,
    the fluid inlet in fluid communication with the hydraulic fluid passage circuit.

12. The hydraulic tool of claim 9, wherein the ram piston includes a ram cavity at an end of the ram piston, the ram cavity positioned at a back portion of the ram chamber proximate to the fluid inlet.

13. The hydraulic tool of claim 12, wherein the first hydraulic pressure reaction force and the second supporting force seal the burst disc against the ram cavity.

14. The hydraulic tool of claim 9 further comprising a cutting head.

15. The hydraulic tool of claim 12, wherein the lock nut is threaded to the ram cavity.

16. A hydraulic tool comprising:
    a manifold that defines a ram chamber having a fluid inlet to receive a pressurized hydraulic fluid;
    a ram assembly having a ram piston disposed within at least a portion of the ram chamber;
    a burst disc having a peripheral flange;
    a spacer in contact with the burst disc at the peripheral flange;
    a lock nut to receive a first hydraulic pressure reaction force acting in a first direction and a second supporting force acting in the first direction; and
    a ball positioned between the lock nut and the spacer.

17. The hydraulic tool of claim 16, wherein the first hydraulic pressure reaction force results from the pressurized hydraulic fluid pushing on the ram piston during operation of the hydraulic tool, and the second supporting force applied on the lock nut and transferred to the burst disc.

18. The hydraulic tool of claim 16, further comprising:
    a hydraulic fluid passage circuit for hydraulically driving the hydraulic tool,
    the fluid inlet in fluid communication with the hydraulic fluid passage circuit.

19. The hydraulic tool of claim 16, wherein the ram piston includes a ram cavity at an end of the ram piston, the ram cavity positioned at a back portion of the ram chamber proximate to the fluid inlet.

20. The hydraulic tool of claim 19, wherein the first hydraulic pressure reaction force and the second supporting force seal the burst disc against the ram cavity.

\* \* \* \* \*